United States Patent
Oikawa et al.

(10) Patent No.: US 11,971,469 B2
(45) Date of Patent: Apr. 30, 2024

(54) CONTACTLESS SWITCH DEVICE, CONTACTLESS SWITCH SYSTEM, CONTACTLESS SWITCH PROGRAM, AND CONTACTLESS SWITCH METHOD

(71) Applicant: New Japan Radio Co., Ltd., Tokyo (JP)

(72) Inventors: Kazuo Oikawa, Fujimino (JP); Satoshi Sasaki, Fujimino (JP)

(73) Assignee: NEW JAPAN RADIO CO., LTD., Tokyo (JP)

( * ) Notice: Subject to any disclaimer, the term of this patent is extended or adjusted under 35 U.S.C. 154(b) by 295 days.

(21) Appl. No.: 17/514,377

(22) Filed: Oct. 29, 2021

(65) Prior Publication Data
US 2022/0137200 A1  May 5, 2022

(30) Foreign Application Priority Data

Nov. 4, 2020  (JP) .................... 2020-184338

(51) Int. Cl.
  *G01S 13/50*  (2006.01)
  *G01S 7/35*  (2006.01)
  *G06F 3/01*  (2006.01)
(52) U.S. Cl.
  CPC ............ *G01S 13/505* (2013.01); *G01S 7/354* (2013.01); *G06F 3/017* (2013.01)
(58) Field of Classification Search
  CPC .......... G01S 7/354; G01S 7/358; G01S 7/415; G01S 13/38; G01S 13/56; G01S 13/62; G01S 13/505
  See application file for complete search history.

(56) References Cited

U.S. PATENT DOCUMENTS

| 11,221,680 | B1* | 1/2022 | Clements | ................ G06F 3/017 |
| 2013/0176258 | A1* | 7/2013 | Dahl | ..................... G06F 3/016 345/173 |
| 2015/0301615 | A1* | 10/2015 | Kasar | ..................... G06F 3/017 345/156 |
| 2016/0030620 | A1* | 2/2016 | Peterson | ................ A61L 9/042 261/84 |

FOREIGN PATENT DOCUMENTS

| CN | 108344996 | * 7/2018 | ............ G06V 40/28 |
| JP | 11-311061 | 11/1999 | |

\* cited by examiner

*Primary Examiner* — James R Hulka
*Assistant Examiner* — Maxine Mckenzie Phillips
(74) *Attorney, Agent, or Firm* — Ohlandt, Greeley and Perle, LLP

(57) ABSTRACT

A contactless switch device including a reflected signal acquisition unit that acquires a reflected signal of a Doppler radar or a distance measurement radar, an approach and recede detection unit that detects an approach and a recede of a target based on the reflected signal, a target identification unit that identifies the target as a hand waving left and right, up and down, or back and forth, or a thing other than the hand based on a repeated pattern of the approach and the recede of the target, and a switch control unit that executes on-and-off controls on a switch-controlled object based on whether the target is the hand waving left and right, up and down, or back and forth, or the thing other than the hand.

10 Claims, 7 Drawing Sheets

CONTACTLESS SWITCH DEVICE, CONTACTLESS SWITCH SYSTEM, CONTACTLESS SWITCH PROGRAM, AND CONTACTLESS SWITCH METHOD

BACKGROUND OF THE DISCLOSURE

1. Field of the Disclosure

This disclosure relates to a contactless switch that executes on-and-off controls on a switch-controlled object.

2. Description of the Related Art

A contactless switch that executes on-and-off controls on a switch-controlled object is disclosed in, for example, Patent Document 1. Patent Document 1 discloses a contactless proximity switch that detects a human/an obstacle on a stationary building side of a moving door to enable opening/closing controls and anti-collision of the moving door.

[Patent Document 1] JP-A-11-311061

Besides Patent Document 1, executing on-and-off controls on a switch-controlled object by detecting a hand that comes into proximity of a radar sensor may be considered. However, depending on a material, shape, size, or the like of a radar reflecting object, a reflection intensity of an object that is distant from the radar sensor may become higher than a reflection intensity of the hand in the proximity of the radar sensor. Accordingly, though the object that is distant from the radar sensor is actually detected, it may erroneously be determined that the hand in the proximity of the radar sensor is detected and could cause on-and-off control on the switch-controlled object to be executed.

Therefore, to solve the above problem, an objective of this disclosure is to identify a hand in the proximity of a radar sensor and an object distant from the radar sensor, when on-and-off controls on the switch-controlled object is executed, by detecting the hand in the proximity of the radar sensor.

SUMMARY

To solve the above problem, a target is identified as a hand waving left and right, up and down, or back and forth, or a thing other than the hand based on a repeated pattern of an approach and recede of the target.

Specifically, this disclosure is a contactless switch device that includes a reflected signal acquisition unit that acquires a reflected signal of a Doppler radar or a distance measurement radar, an approach and recede detection unit that detects an approach and a recede of a target based on the reflected signal, a target identification unit that identifies the target as a hand waving left and right, up and down, or back and forth, or a thing other than the hand based on a repeated pattern of the approach and the recede of the target, and a switch control unit that executes on-and-off controls on a switch-controlled object based on whether the target is the hand waving left and right, up and down, or back and forth, or the thing other than the hand.

Furthermore, this disclosure is a contactless switch program for allowing a computer to execute, in a descending order, a reflected signal acquisition step of acquiring a reflected signal of a Doppler radar or a distance measurement radar, an approach and recede detection step of detecting an approach and a recede of a target based on the reflected signal, a target identification step of identifying the target as a hand waving left and right, up and down, or back and forth, or a thing other than the hand based on a repeated pattern of the approach and the recede of the target, and a switch control step of executing on-and-off controls on a switch-controlled object based on whether the target is the hand waving left and right, up and down, or back and forth, or the thing other than the hand.

Furthermore, this disclosure is a contactless switch method that includes, in a descending order, a reflected signal acquisition step of acquiring a reflected signal of a Doppler radar or a distance measurement radar, an approach and recede detection step of detecting an approach and a recede of a target based on the reflected signal, a target identification step of identifying the target as a hand waving left and right, up and down, or back and forth, or a thing other than the hand based on a repeated pattern of the approach and the recede of the target, and a switch control step of executing on-and-off controls on a switch-controlled object based on whether the target is the hand waving left and right, up and down, or back and forth, or the thing other than the hand.

According to these configurations, the hand, in the proximity of the radar sensor, waving left and right, up and down, or back and forth and the thing other than the hand (such as an object that is distant from the radar sensor) can be identified based on the repeated pattern (the number of repetitions and a time period of each approach and recede) of the approach and recede of the target.

Furthermore, this disclosure is a contactless switch device in which the target identification unit identifies the target as the hand waving left and right, up and down or back and forth when the number of repetitions of the approach and recede of the target is equal to or more than a predetermined number, and identifies the target as the thing other than the hand when the number of repetitions of the approach and recede of the target is less than the predetermined number.

According to this configuration, the hand, in the proximity of the radar sensor, waving left and right, up and down, or back and forth (and having a large number of repetitions) and the thing other than the hand (such as an object that is distant from the radar sensor and has a small number of repetitions) can be identified based on the number of repetitions of the approach and recede of the target.

Furthermore, this disclosure is a contactless switch device in which the target identification unit identifies the target as the hand waving left and right, up and down, or back and forth when a time period of each approach and recede of the target is less than a first time period, and identifies the target as a slowly-moving object when the time period of each approach and recede of the target is equal to or more than the first time period.

According to this configuration, the hand, in the proximity of the radar sensor, waving left and right, up and down, or back and forth (the time period of each approach and recede is shorter) and the slowly-moving object (such as an object that is distant from the radar sensor, the time period of each approach and recede is longer) can be identified based on the time period of each approach and recede of the target.

Furthermore, this disclosure is a contactless switch device in which the target identification unit identifies the target as the hand waving left and right, up and down, or back and forth when the time period of each approach and recede of the target is equal to or more than a second time period, and identifies the target as a noise source when the time period of each approach and recede of the target is less than the second time period.

According to this configuration, the hand, in the proximity of the radar sensor, waving left and right, up and down, or back and forth (the time period of each approach and recede is longer) and the noise source (such as a metal piece that undergoes a free fall, the time period of each approach and recede is shorter) can be identified based on the time period of each approach and recede of the target.

Furthermore, this disclosure is a contactless switch device in which the approach and recede detection unit, (1) is regarded to detect an approach of the target until the approach and recede detection unit begins to detect a recede of the target even when the detection of the approach of the target is not continuous while the approach of the target is being detected, and (2) is regarded to detect a recede of the target until the approach and recede detection unit begins to detect an approach of the target even when the detection of the recede of the target is not continuous while the recede of the target is being detected.

According to this configuration, the repeated pattern of the approach and the recede of the target (such as the number of repetitions and the time period of each approach and recede) can be correctly detected even when the radar reflected signal includes noise.

Furthermore, this disclosure is a contactless switch system including the above contactless switch device, a transceiver device of the Doppler radar or the distance measurement radar.

According to this configuration, a system with the above effect can be provided.

Thus, this disclosure can identify the hand in the proximity of the radar sensor and the object distant from the radar sensor when the on-and-off controls on the switch-controlled object is executed by detecting the hand in the proximity of the radar sensor.

DESCRIPTION OF THE PREFERRED EMBODIMENTS

An embodiment of this disclosure will be described in accordance with the accompanying drawings. The embodiment described below is an exemplary embodiment of this disclosure and this disclosure is not limited to the following embodiment.

(Outline of Contactless Switch System of Disclosure)

Figure 1:
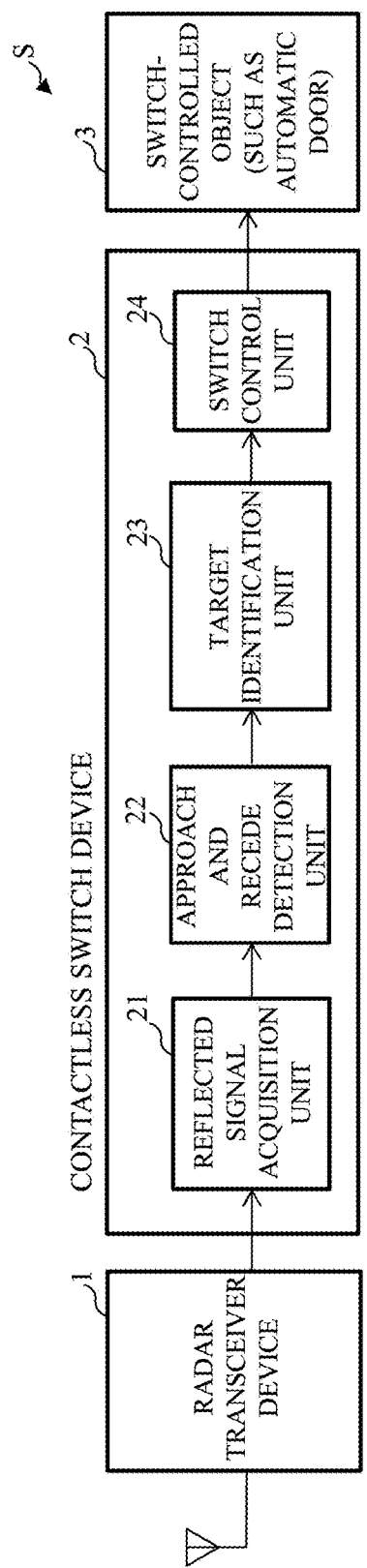
FIG. 1 is a drawing that illustrates a configuration of a contactless switch system according to this disclosure.

A configuration of a contactless switch system according to this disclosure is illustrated in FIG. 1. A contactless switch system S includes a radar transceiver device 1, a contactless switch device 2, and a switch-controlled object 3.

The radar transceiver device 1 is a transceiver device as a Doppler radar or a distance measurement radar. As the Doppler radar, the radar transceiver device 1 can detect an approach and a recede of a target by executing a phase identification using an IQ mixer. As the distance measurement radar, the radar transceiver device 1 can detect the approach and the recede of the target by executing a distance measurement using an FMCW or an FSK.

The contactless switch device 2 includes a reflected signal acquisition unit 21, an approach and recede detection unit 22, a target identification unit 23, and a switch control unit 24, and is achievable by installing a contactless switch program that executes timing charts illustrated in FIGS. 4 to 7 on a computer.

The reflected signal acquisition unit 21 acquires reflected signals of the Doppler radar or the distance measurement radar. The approach and recede detection unit 22 detects the approach and the recede of the target based on the reflected signals.

The target identification unit 23 identifies whether the target is a hand waving left and right, up and down, or back and forth, or a thing other than the hand based on a repeated pattern of the approach and the recede of the target. The switch control unit 24 executes on-and-off controls on the switch-controlled object 3 (such as an automatic door) based on whether the target is the hand waving left and right, up and down, or back and forth, or the thing other than the hand.

Figure 2:
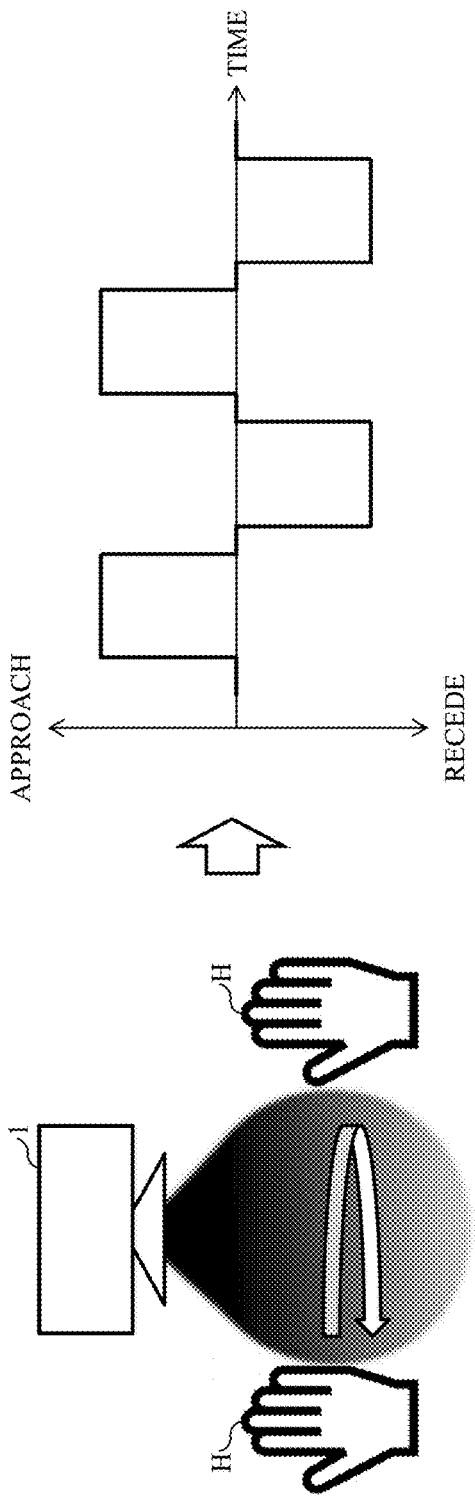
FIG. 2 is a drawing that illustrates a method for identifying a hand waving left and right, up and down, or back and forth according to this disclosure.
Figure 2:
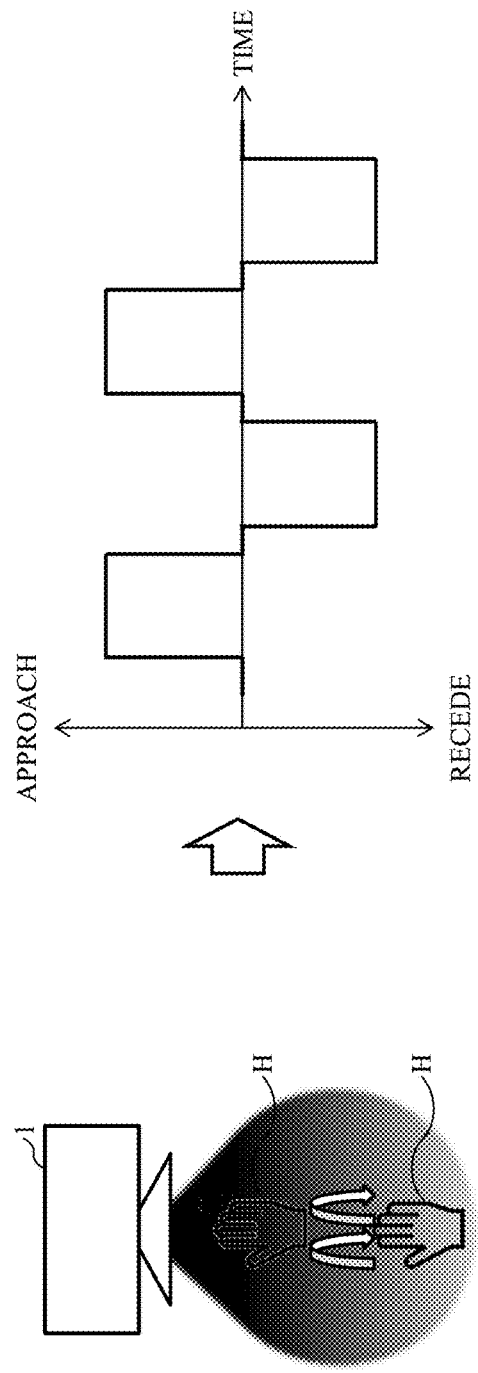

A method for identifying the hand waving left and right, up and down, or back and forth according to this disclosure is illustrated in FIG. 2. In an upper part of FIG. 2, a hand waving left and right or up and down is identified. In a lower part of FIG. 2, the hand H waving back and forth is identified.

In the upper part of FIG. 2, the hand H moves toward the radar transceiver device 1 in the order of "outside of beam," "left side or upper side," "front of beam," "right side or lower side," "outside of beam," "right side or lower side," "front of beam," "left side or upper side," "outside of beam." The approach and recede detection unit 22, according to the moving order of the hand H, outputs signals in an order of "zero signal," "approach signal," "zero signal," "recede signal," "zero signal," "approach signal," "zero signal," "recede signal," "zero signal." A time period of each approach and recede of the hand H is not excessively long nor excessively short.

The target identification unit 23 identifies the target as the hand H waving left and right or up and down based on the fact that the number of repetitions of the approach and recede of the target is equal to or more than a predetermined number (here, twice or more for each) and the time period of each approach and recede of the target is less than a maximum time period and equal to or more than a minimum time period.

In the lower part of FIG. 2, the hand H moves toward the radar transceiver device 1 in the order of "far from sensor," "far to near," "halt near," "near to far," "halt far," "far to near," "halt near," "near to far," "far from sensor." The approach and recede detection unit 22, according to the moving order of the hand H, outputs signals in an order of "zero signal," "approach signal," "zero signal," "recede signal," "zero signal," "approach signal," "zero signal," "recede signal," "zero signal." A time period of each approach and recede of the hand H is not excessively long nor excessively short.

The target identification unit 23 identifies a possibility that the target may be the hand H waving back and forth based on the fact that the number of repetitions of the approach and recede of the target is equal to or more than a predetermined number (here, twice or more for each) and the time period of each approach and recede of the target is less than the maximum time period and equal to or more than the minimum time period.

Figure 3:
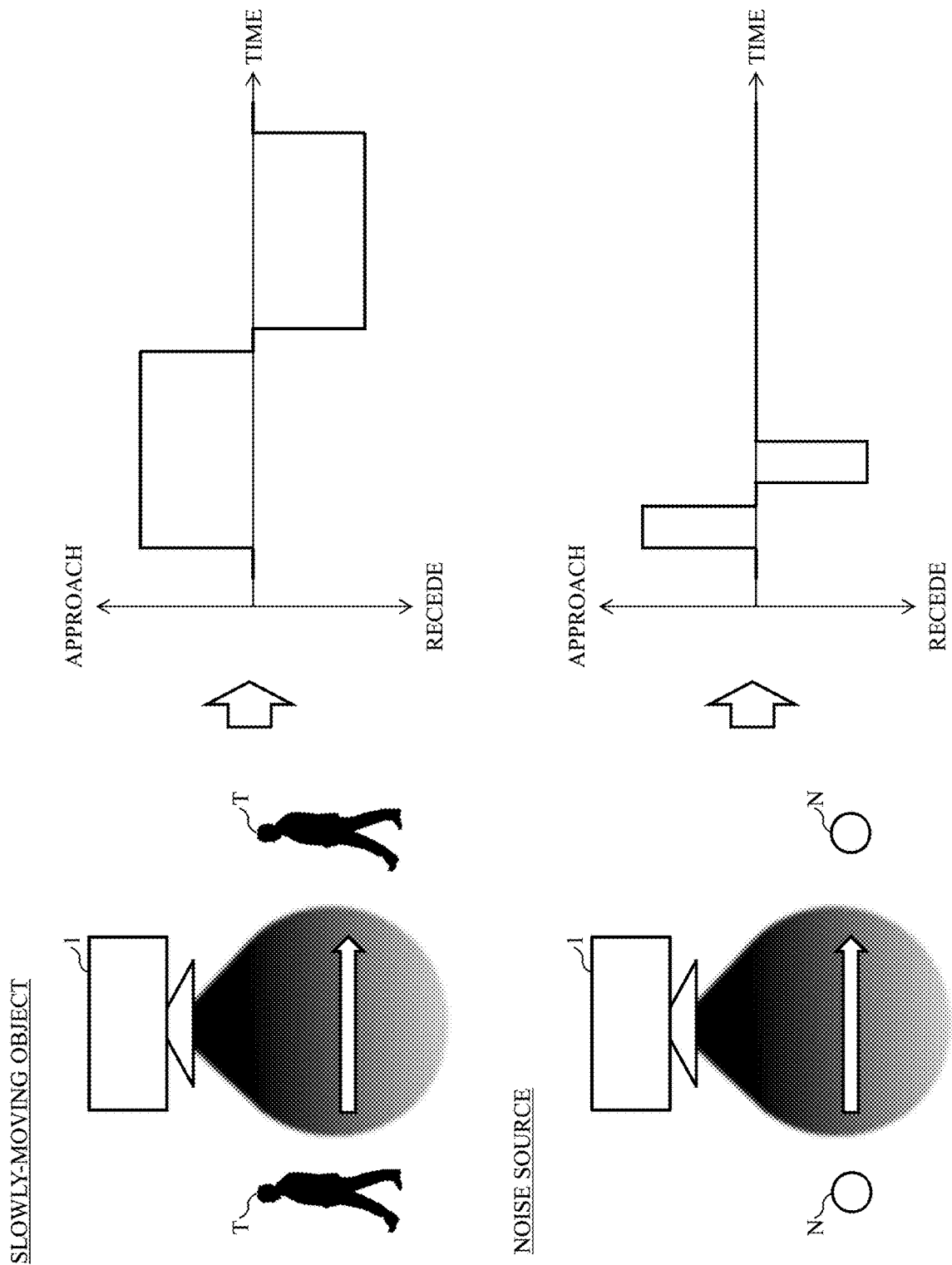
FIG. 3 is a drawing that illustrates a method for identifying a slowly-moving object or a noise source according to this disclosure.

A method for identifying a slowly-moving object and a noise source according to this disclosure is illustrated in FIG. 3. In an upper part of FIG. 3, a slowly-moving object T (such as an object that is distant from the radar transceiver device 1) is identified. In a lower part of FIG. 3, a noise source N (such as a metal piece that undergoes a free fall) is identified.

In the upper part of FIG. 3, the slowly-moving object T moves toward the radar transceiver device 1 in an order of "outside of beam," "left side of beam," "front of beam," "right side of beam," "outside of beam." The slowly-moving object T does not swing intentionally over and over again like the hand H illustrated in FIG. 2. The approach and recede detection unit 22 according to the moving order of the slowly-moving object T outputs signals in the order of "zero signal," "approach signal," "zero signal," "recede signal," "zero signal." A time period of each approach and recede of the slowly-moving target T is sufficiently long.

The target identification unit 23 identifies the target as the slowly-moving object T based on the fact that the number of repetitions of the approach and recede of the target is less than the predetermined number (here, less than twice for each) and the time period of each approach and recede of the target is equal to or more than the maximum time period (and needless to say, equal to or more than the minimum time period).

In the lower part of FIG. 3, the noise source N moves toward the radar transceiver device 1 in an order of "outside of beam," "upper side of beam," "front of beam," "lower side of beam," "outside of beam." The noise source N does not swing intentionally over and over again like the hand H illustrated in FIG. 2. The approach and recede detection unit 22, according to a moving order of the noise source N, outputs signals in an order of "zero signal," "approach signal," "zero signal," "recede signal," "zero signal." A time period of each approach and recede of the noise source N is sufficiently short.

The target identification unit 23 identifies the target as the noise source N based on the fact that the number of repetitions of the approach and recede of the target is less than the predetermined number (here, less than twice for each) and the time period of each approach and recede of the target is less than the minimum time period (needless to say, less than the maximum time period).

Regarding the number of repetitions of the approach and recede of the target, the larger the predetermined number is, the more accurate it becomes to identify whether the hand H waving left and right, up and down, or back and forth, and a thing other than the hand H (such as an object that is distant from the radar transceiver device 1). The smaller the predetermined number is, the more the work required for identifying the target is reduced.

Regarding the time period of each approach and recede of the target, the maximum time period and the minimum time period are only necessary to be set according to a proximity and a waving speed of the hand H waving left and right, up and down, or back and forth, and a beam expansion of the radar transceiver device 1. Then, the maximum time period is only necessary to be further set according to the moving speed of the slowly-moving object T (such as an object that is distant from the radar transceiver device 1). Meanwhile, the minimum time period is only necessary to be further set according to a noise period of the noise source N (such as a metal piece that undergoes a free fall).

(Detail of Contactless Switch System of Disclosure)

Figure 4:
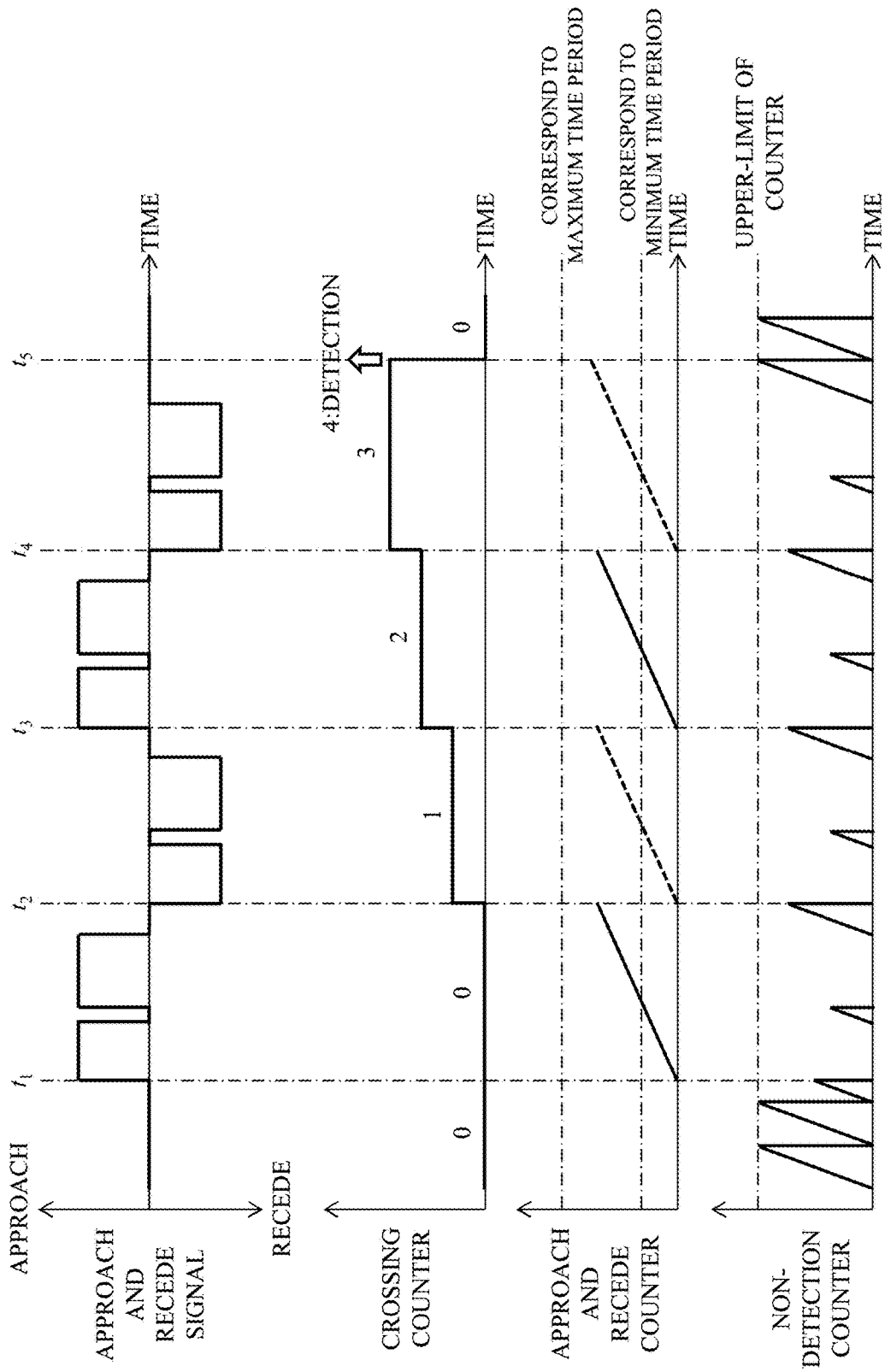
FIG. 4 is a drawing that illustrates a procedure for identifying a hand waving left and right, up and down, or back and forth according to this disclosure.

A procedure of identifying the hand waving left and right, up and down, or back and forth according to this disclosure is illustrated in FIG. 4. The approach and recede detection unit 22 outputs a zero signal until time $t_1$, outputs an approach signal and subsequently outputs the zero signal between times $t_1$ to $t_2$, outputs a recede signal and subsequently outputs the zero signal between times $t_2$ to $t_3$, outputs the approach signal and subsequently outputs the zero signal between times $t_3$ to $t_4$, and outputs the recede signal and subsequently outputs the zero signal between times $t_4$ to $t_5$.

The approach and recede detection unit 22 first increments an approach counter or a recede counter from 0 when the approach signal or the recede signal begins to be output, and then, resets the approach counter or the recede counter to 0 when the recede signal or the approach signal begins to be output.

The target identification unit 23 first keeps a crossing counter set at 0 when the approach signal or the recede signal begins to be output, then, increments the crossing counter to 1 when the recede signal or the approach signal begins to be output, and repeats the above process for the crossing counter incremented to 1, 2 and 3 in order.

The approach and recede detection unit 22 first increments a non-detection counter from 0 when the zero signal begins to be output, and then, resets the non-detection counter to 0 when the approach signal or the recede signal begins to be output. However, the approach and recede detection unit 22 not only resets the non-detection counter to 0 but also resets the approach counter or the recede counter and the crossing counter to 0 when the non-detection counter is incremented to the upper-limit value of the counter.

Even when a detection of an approach of a target is not continuous while the approach of the target is being detected, the approach and recede detection unit 22 is regarded to detect the approach of the target until it begins to detect a recede of the target. Meanwhile, even when a detection of a recede of a target is not continuous while the recede of the target is being detected, the approach and recede detection unit 22 is regarded to detect the recede of the target until it begins to detect an approach of the target.

In an approach signal period between times $t_1$ to $t_2$, the approach counter is incremented from 0 and the crossing counter is kept set at 0. The approach signal period between times $t_1$ to $t_2$ includes a short-term noise signal period but the approach counter continues to be incremented and the crossing counter is kept set at 0. Even in a short-term zero signal period between times $t_1$ to $t_2$, the approach counter continues to be incremented and the crossing counter is kept set at 0. After a full signal period between times $t_1$ to $t_2$, a final value of the approach counter becomes less than a counter value that corresponds to the maximum time period in FIGS. 2, 3 and equal to or more than a counter value that corresponds to the minimum time period in FIGS. 2, 3.

In a recede signal period between times $t_2$ to $t_3$, the recede counter is incremented from 0 and the crossing counter is incremented to 1. The recede signal period between times $t_2$ to $t_3$ includes a short-term noise signal period but the recede counter continues to be incremented and the crossing counter is kept set at 1. Even in a short-term zero signal period between times $t_2$ to $t_3$, the recede counter continues to be incremented and the crossing counter is kept set at 1. After a full signal period between times $t_2$ to $t_3$, a final value of the recede counter becomes less than the counter value that corresponds to the maximum time period in FIGS. 2, 3 and equal to or more than the counter value that corresponds to the minimum time period in FIGS. 2, 3.

In an approach signal period between times $t_3$ to $t_4$, the approach counter is incremented from 0 and the crossing counter is incremented to 2. The approach signal period between times $t_3$ to $t_4$ includes a short-term noise signal period but the approach counter continues to be incremented and the crossing counter is kept set at 2. Even in a short-term zero signal period between times $t_3$ to $t_4$, the approach counter continues to be incremented and the crossing counter is kept set at 2. After a full signal period between times $t_3$ to $t_4$, a final value of the approach counter becomes less than the counter value that corresponds to the maximum time period in FIGS. 2, 3 and equal to or more than the counter value that corresponds to the minimum time period in FIGS. 2, 3.

In a recede signal period between times $t_4$ to $t_5$, the recede counter is incremented from 0 and the crossing counter is incremented to 3. The recede signal period between times $t_4$ to $t_5$ includes a short-term noise signal period but the recede counter continues to be incremented and the crossing counter is kept set at 3. After a long-term zero signal period between times $t_4$ to $t_5$, the recede counter is reset to 0 and the crossing counter, after being incremented to 4, is reset to 0. After a full signal period between times $t_4$ to $t_5$, a final value of the recede counter becomes less than the counter value that corresponds to the maximum time period in FIGS. 2, 3 and equal to or more than the counter value that corresponds to the minimum time period in FIGS. 2, 3. Based on the crossing counter "4," the hand H waving left and right, up and down, or back and forth is detected and the on-and-off controls on the switch-controlled object 3 (such as an automatic door) is executed.

Figure 5:
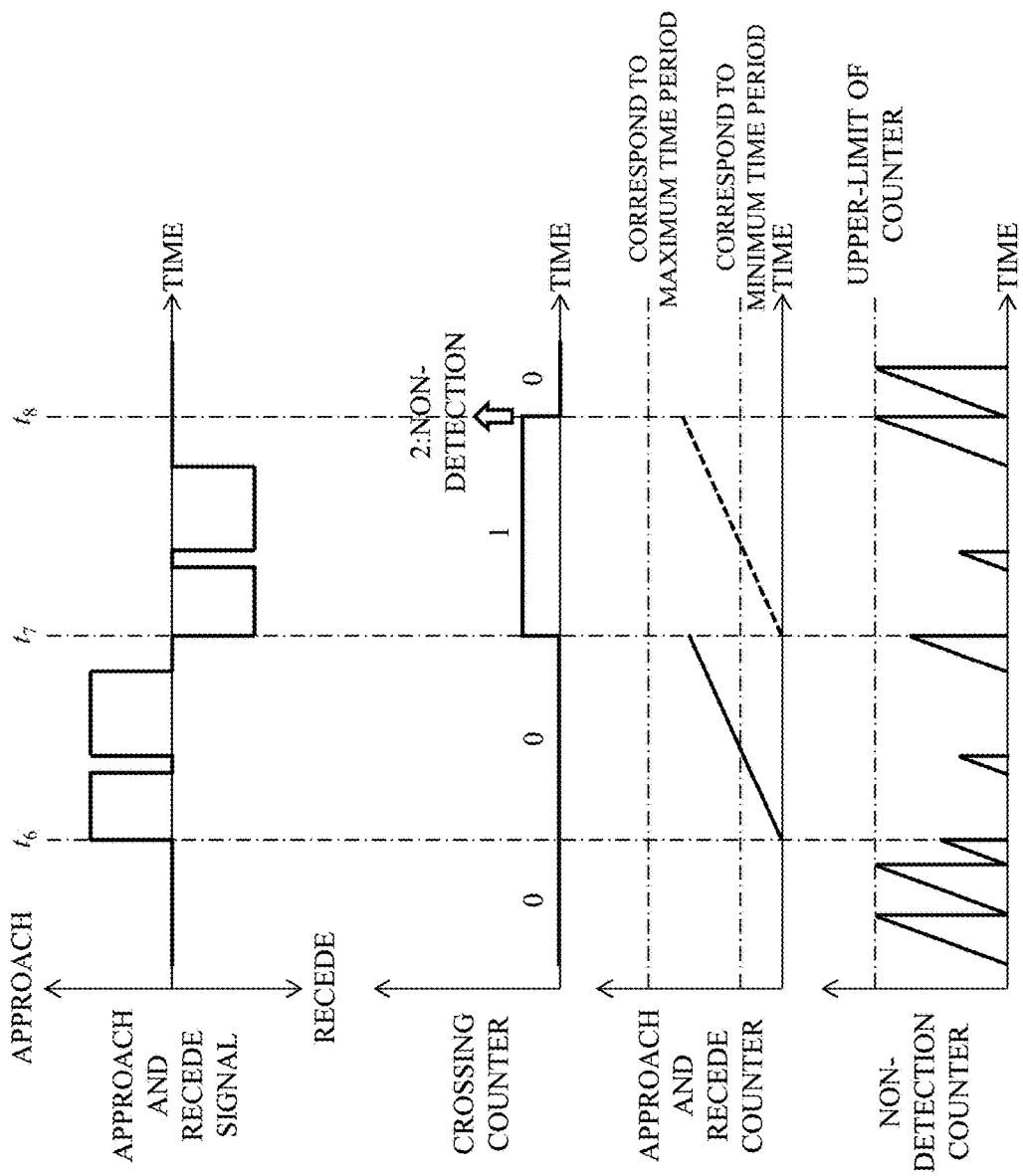
FIG. 5 is a drawing that illustrates a procedure for identifying an object waving for a small number of waving motions according to this disclosure.

A procedure for identifying an object (such as the hand H) waving for a small number of times according to this disclosure is illustrated in FIG. 5. The approach and recede detection unit 22 outputs a zero signal until time $t_6$, outputs an approach signal and subsequently outputs the zero signal between times $t_6$ to $t_7$, and outputs a recede signal and subsequently outputs the zero signal between times $t_7$ to $t_8$.

In an approach signal period between times $t_6$ to $t_7$, the approach counter is incremented from 0 and the crossing counter is kept set at 0. The approach signal period between times $t_6$ to $t_7$ includes a short-term noise signal period but the approach counter continues to be incremented and the crossing counter is kept set at 0. Even in a short-term zero signal period between times $t_6$ to $t_7$, the approach counter continues to be incremented and the crossing counter is kept set at 0. After a full signal period between times $t_6$ to $t_7$, a final value of the approach counter becomes less than the counter value that corresponds to the maximum time period in FIGS. 2, 3 and equal to or more than the counter value that corresponds to the minimum time period in FIGS. 2, 3.

In a recede signal period between times $t_7$ to $t_8$, the recede counter is incremented from 0 and the crossing counter is incremented to 1. The recede signal period between times $t_7$ to $t_8$ includes a short-term noise signal period but the recede counter continues to be incremented and the crossing counter is kept set at 1. After a long-term zero signal period between times $t_7$ to $t_8$, the recede counter is reset to 0 and the crossing counter, after being incremented to 2, is reset to 0. After a full signal period between times $t_7$ to $t_8$, a final value of the recede counter becomes less than the counter value that corresponds to the maximum time period in FIGS. 2, 3 and equal to or more than the counter value that corresponds to the minimum time period in FIGS. 2, 3. Based on the crossing counter "2," the hand H waving left and right, up and down, or back and forth is not detected and the on-and-off controls on the switch-controlled object 3 (such as an automatic door) is cancelled.

Figure 6:
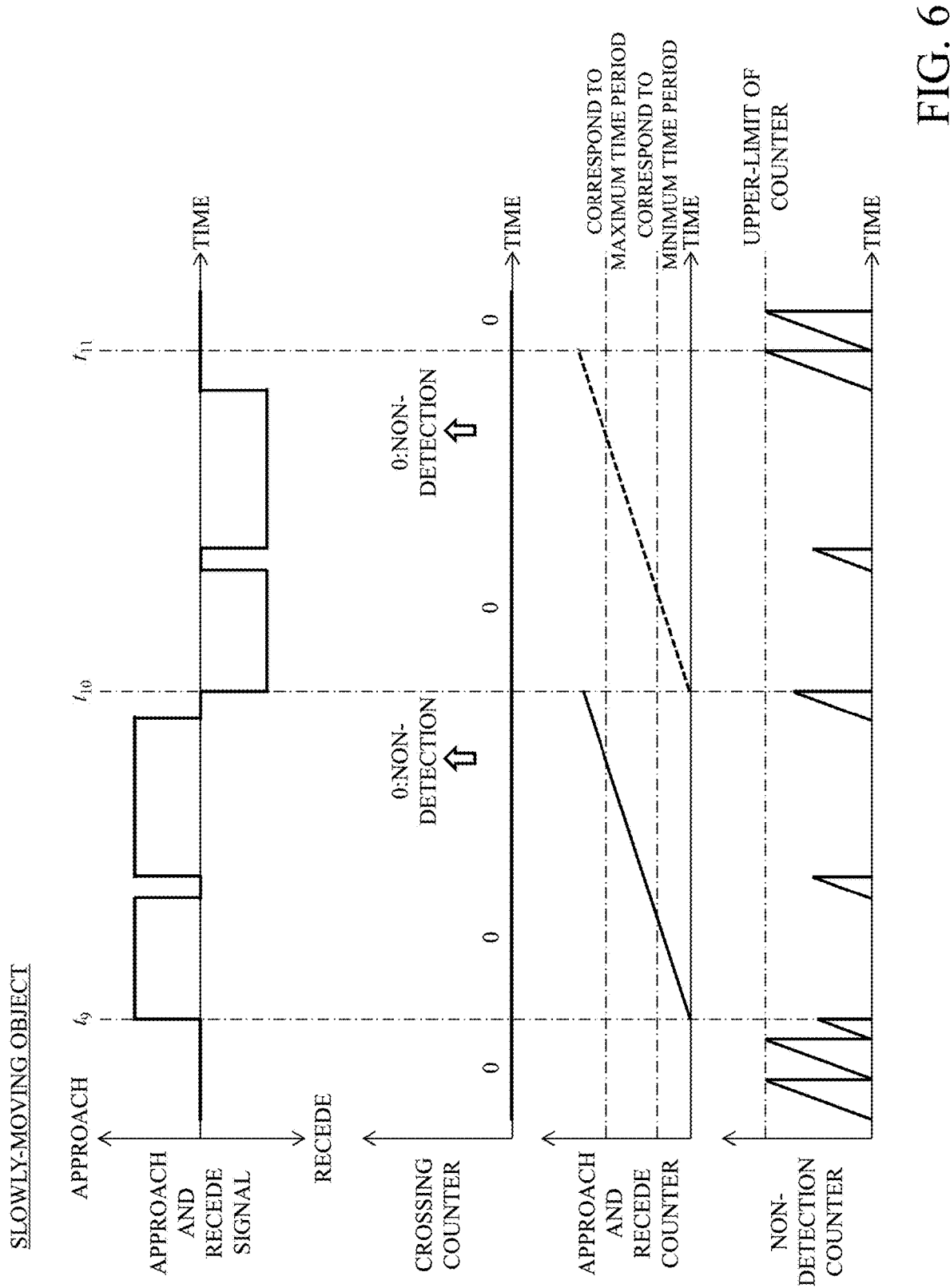
FIG. 6 is a drawing that illustrates a procedure for identifying a slowly-moving object according to this disclosure.

A procedure for identifying a slowly-moving object (such as an object that is distant from the sensor) according to this disclosure is illustrated in FIG. 6. The approach and recede detection unit 22 outputs a zero signal until time $t_9$ and outputs an approach signal and subsequently outputs the zero signal between times $t_9$ to $t_{10}$, and outputs a recede signal and subsequently outputs the zero signal between times $t_{10}$ to $t_{11}$.

In an approach signal period between times $t_9$ to $t_{10}$, the approach counter is incremented from 0 and the crossing counter is kept set at 0. The approach signal period between times $t_9$ to $t_{10}$ includes a short-term noise signal period but the approach counter continues to be incremented and the crossing counter is kept set at 0. Even in a short-term zero signal period between times $t_9$ to $t_{10}$, the approach counter continues to be incremented. However, in a full signal period between times $t_9$ to $t_{10}$, a middle value of the approach counter becomes equal to or more than the counter value that corresponds to the maximum time period in FIGS. 2, 3. Therefore, based on the crossing counter "0," the hand H waving left and right, up and down, or back and forth is not detected and the on-and-off controls on the switch-controlled object 3 (such as an automatic door) is cancelled.

In a recede signal period between times $t_{10}$ to $t_{11}$, the recede counter is incremented from 0 and the crossing counter is kept set at 0. The recede signal period between times $t_{10}$ to $t_{11}$ includes a short-term noise signal period but the recede counter continues to be incremented and the crossing counter is kept set at 0. Even in a long-term zero signal period between times $t_{10}$ to $t_{11}$, the recede counter continues to be incremented. However, in a full signal period between times $t_{10}$ to $t_{11}$, a middle value of the recede counter becomes equal to or more than the counter value that corresponds to the maximum time period in FIGS. 2, 3. Therefore, based on the crossing counter "0," the hand H waving left and right, up and down, or back and forth is not detected and the on-and-off controls on the switch-controlled object 3 (such as an automatic door) is cancelled.

Figure 7:
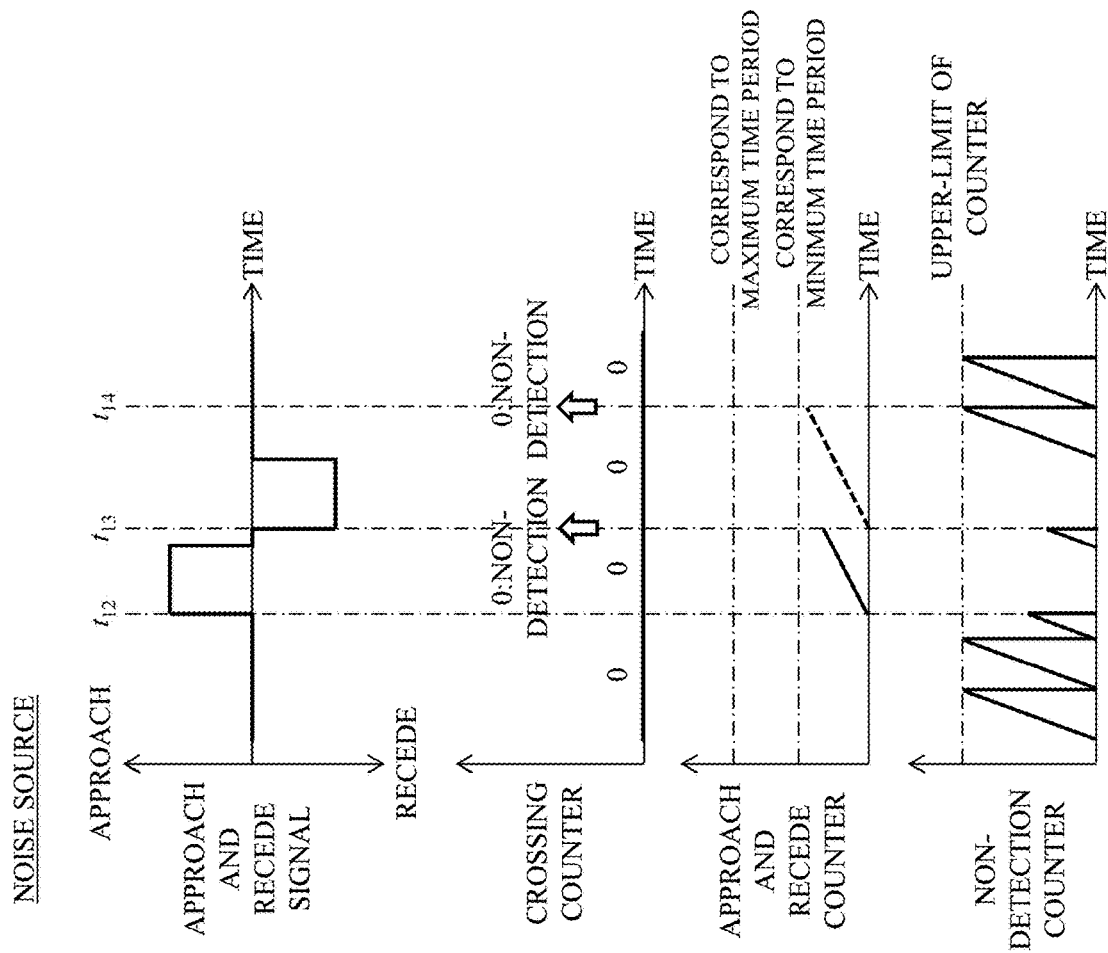
FIG. 7 is a drawing that illustrates a procedure for identifying a noise source according to this disclosure.

A procedure for identifying the noise source (such as a metal piece that undergoes a free fall) according to this disclosure is illustrated in FIG. 7. The approach and recede detection unit 22 outputs a zero signal until time $t_{12}$, outputs an approach signal and subsequently outputs the zero signal between times $t_{12}$ to $t_{13}$, and outputs a recede signal and subsequently outputs the zero signal between times $t_{13}$ to $t_{14}$.

In an approach signal period between times $t_{12}$ to $t_{13}$, the approach counter is incremented from 0 and the crossing counter is kept set at 0. In a short-term zero signal period between times $t_{12}$ to $t_{13}$, the approach counter continues to be incremented. However, after a full signal period between times $t_{12}$ to $t_{13}$, a final value of the approach counter becomes less than the counter value that corresponds to the minimum time period in FIGS. 2, 3. Therefore, based on the crossing counter "0," the hand H waving left and right, up and down, or back and forth is not detected and the on-and-off controls on the switch-controlled object 3 (such as an automatic door) is cancelled.

In a recede signal period between times $t_{13}$ to $t_{14}$, the recede counter is incremented from 0 and the crossing counter is kept set at 0. In a long-term zero signal period between times $t_{13}$ to $t_{14}$, the recede counter continues to be incremented. However, after a full signal period between times $t_{13}$ to $t_{14}$, a final value of the recede counter becomes less than the counter value that corresponds to the minimum time period in FIGS. 2, 3. Therefore, based on the crossing counter "0," the hand H waving left and right, up and down, or back and forth is not detected and the on-and-off controls on the switch-controlled object 3 (such as an automatic door) is cancelled.

In FIGS. 4 to 7, a maximum time period for crossing once and a minimum time period for crossing once are set in regard to the time period of each approach and recede of the target. As a modification, a maximum whole time (here, 4 times the maximum time period for crossing once) and a minimum whole time (here, 4 times the minimum time period for crossing once) may be set for a time period of the repetitions of the approach and recede of the target. In FIGS. 4 to 7, the approach of the target is first detected, next the recede of the target is detected, and thereafter, these are repeated. As a modification, the recede of the target may be first detected, next the approach of the target may be detected, and thereafter, these may be repeated.

INDUSTRIAL APPLICABILITY

The contactless switch device, the contactless switch system, the contactless switch program, and the contactless switch method according to this disclosure can execute the on-and-off controls on an automatic door or the like.

DESCRIPTION OF REFERENCE SIGNS

S: contactless switch system
1: radar transceiver device
2: contactless switch device
3: switch-controlled object
21: reflected signal acquisition unit
22: approach and recede detection unit
23: target identification unit
24: switch control unit
H: hand
T: slowly-moving object
N: noise source

What is claimed is:

1. A contactless switch device based on a reflected signal of a Doppler radar or a distance measurement radar, said contactless switch device comprising:
    an approach and recede detection counter that detects an approach and a recede of a target based on the reflected signal;
    wherein the approach and recede detection counter is (i) regarded to detect an approach of the target until the approach and recede detection counter begins to detect a recede of the target even when the detection of the approach of the target is not continuous while the approach of the target is being detected, and is (ii) regarded to detect a recede of the target until the approach and recede detection counter begins to detect an approach of the target even when the detection of the recede of the target is not continous while the recede of the target is being detected;
    a target identification counter that identifies the target as a hand waving left and right, up and down, or back and forth, or a thing other than the hand based on a repeated pattern of the approach and the recede of the target; and
    a switch control circuit that executes on-and-off controls on a switch-controlled object based on whether the target is the hand waving left and right, up and down, or back and forth, or the thing other than the hand.

2. The contactless switch device according to claim 1, wherein
    the target identification counter identifies the target as the hand waving left and right, up and down, or back and forth when the number of repetitions of the approach and recede of the target is equal to or more than a predetermined number, and identifies the target as the thing other than the hand when the number of repetitions of the approach and recede of the target is less than the predetermined number.

3. A contactless switch system comprising:
    the contactless switch device according to claim 2; and
    a transceiver device of the Doppler radar or the distance measurement radar.

4. The contactless switch device according to claim 1, wherein
    the target identification counter identifies the target as the hand waving left and right, up and down, or back and forth when a time period of each approach and recede of the target is less than a first time period, and identifies the target as a slowly-moving object when the time period of each approach and recede of the target is equal to or more than the first time period.

5. A contactless switch system comprising:
    the contactless switch device according to claim 3; and
    a transceiver device of the Doppler radar or the distance measurement radar.

6. The contactless switch device according to claim 1, wherein
    the target identification counter identifies the target as the hand waving left and right, up and down, or back and forth when a time period of each approach and recede of the target is equal to or more than a second time period, and identifies the target as a noise source when the time period of each approach and recede of the target is less than the second time period.

7. A contactless switch system comprising:
    the contactless switch device according to claim 6; and
    a transceiver device of the Doppler radar or the distance measurement radar.

8. A contactless switch system comprising:
    the contactless switch device according to claim 1; and
    a transceiver device of the Doppler radar or the distance measurement radar.

9. A contactless switch program storage medium readable by a computer for allowing the computer to execute, in a descending order:
    a reflected signal acquiring a reflected signal of a Doppler radar or a distance measurement radar;
    an approach and recede detecting an approach and a recede of a target based on the reflected signal;
    wherein the approach and recede detection counter is (i) regarded to detect an approach of the target until the approach and recede detection counter begins to detect a recede of the target even when the detection of the approach of the target is not continuous while the approach of the target is being detected, and is (ii) regarded to detect a recede of the target until the approach and recede detection counter begins to detect an approach of the target even when the detection of the recede of the target is not continous while the recede of the target is being detected;
    a target identifying the target as a hand waving left and right, up and down, or back and forth, or a thing other than the hand based on a repeated pattern of the approach and the recede of the target; and a switch controlling executing on-and-off controls on a switch-controlled object based on whether the target is the hand waving left and right, up and down, or back and forth, or the thing other than the hand.

10. A contactless switch method comprising, in a descending order:

a reflected signal acquiring a reflected signal of a Doppler radar or a distance measurement radar;

an approach and recede detecting an approach and a recede of a target based on the reflected signal;

wherein the approach and recede detection counter is (i) regarded to detect an approach of the target until the approach and recede detection counter begins to detect a recede of the target even when the detection of the approach of the target is not continuous while the approach of the target is being detected, and is (ii) regarded to detect a recede of the target until the approach and recede detection counter begins to detect an approach of the target even when the detection of the recede of the target is not continous while the recede of the target is being detected;

a target identifying the target as a hand waving left and right, up and down, or back and forth, or a thing other than the hand based on a repeated pattern of the approach and the recede of the target; and a switch controlling executing on-and-off controls on a switch-controlled object based on whether the target is the hand waving left and right, up and down, or back and forth, or the thing other than the hand.

\* \* \* \* \*